(12) United States Patent
Aggarwal

(10) Patent No.: US 11,062,338 B2
(45) Date of Patent: Jul. 13, 2021

(54) USED-VEHICLE ALGORITHMIC PRICING ENGINE METHOD AND SYSTEM

(71) Applicant: Sandeep Aggarwal, San Jose, CA (US)

(72) Inventor: Sandeep Aggarwal, San Jose, CA (US)

(*) Notice: Subject to any disclaimer, the term of this patent is extended or adjusted under 35 U.S.C. 154(b) by 0 days.

(21) Appl. No.: 16/571,186

(22) Filed: Sep. 15, 2019

(65) Prior Publication Data

US 2020/0167811 A1    May 28, 2020

Related U.S. Application Data

(63) Continuation-in-part of application No. 15/398,304, filed on Jan. 4, 2017, now abandoned.

(60) Provisional application No. 62/900,643, filed on Sep. 15, 2019, provisional application No. 62/277,924, filed on Jan. 12, 2016.

(51) Int. Cl.
    *G06Q 30/02*   (2012.01)
    *G06Q 30/06*   (2012.01)

(52) U.S. Cl.
    CPC ......... *G06Q 30/0206* (2013.01); *G06Q 30/02* (2013.01); *G06Q 30/0201* (2013.01); *G06Q 30/0202* (2013.01); *G06Q 30/0283* (2013.01); *G06Q 30/0611* (2013.01); *G06Q 30/0625* (2013.01); *G06Q 30/0639* (2013.01); *G06Q 30/0633* (2013.01); *G06Q 30/0641* (2013.01)

(58) Field of Classification Search
    None
    See application file for complete search history.

(56) References Cited

U.S. PATENT DOCUMENTS

| 8,005,684 B1* | 8/2011 | Cheng | G06Q 10/06 705/1.1 |
| 8,005,759 B2* | 8/2011 | Hirtenstein | G06Q 30/0283 705/306 |
| 8,612,314 B2* | 12/2013 | Swinson | G06Q 30/0278 705/27.1 |

(Continued)

FOREIGN PATENT DOCUMENTS

| WO | WO-0193133 A1 * | 12/2001 | G06Q 10/06 |
| WO | WO-2012125858 A1 * | 9/2012 | G06Q 40/04 |

OTHER PUBLICATIONS

Fraumeni, B.M., "Measurement of Depreciation in the U.S. National Income and Product Accounts," Survey of Current Business, Jul. 1997, 77.7, pp. 7-23. (Year: 1997).*

*Primary Examiner* — Nicholas D Rosen

(57) ABSTRACT

A computerized system for distributing an estimated monetary value of a used vehicle. The system comprises a server including a pricing engine which, for a used vehicle, identifies the seller of the used vehicle and a used vehicle retailer to which to offer the used vehicle, and determines a mileage and condition of the used vehicle. The server collects used vehicle sample data for different types of used vehicles, and generates a depreciation curve for each used vehicle type based on used vehicle sales data. It then groups each sampled used vehicle type with a set of similar depreciation curves into a depreciation segment, wherein the depreciation segment comprises a group of vehicle types that present a similar depreciation pattern, and matches the used vehicle of the seller to the depreciation segment, determines a monetary value of the used vehicle, and communicates the monetary value to the seller or the retailer.

9 Claims, 16 Drawing Sheets

(56) References Cited

U.S. PATENT DOCUMENTS

| | | | |
|---|---|---|---|
| 8,645,193 B2 * | 2/2014 | Swinson | G06Q 10/06 705/7.35 |
| 10,049,510 B2 * | 8/2018 | Nyalamadugu | G06K 7/10366 |
| 2003/0105728 A1 * | 6/2003 | Yano | G06Q 30/0283 705/400 |
| 2004/0172266 A1 * | 9/2004 | Sheinson | G06Q 30/0278 705/26.1 |
| 2005/0267774 A1 * | 12/2005 | Merritt | G06Q 30/06 705/306 |
| 2008/0046383 A1 * | 2/2008 | Hirtenstein | G06Q 30/0283 705/400 |
| 2009/0006118 A1 * | 1/2009 | Pollak | G06Q 30/0278 705/306 |
| 2009/0157522 A1 * | 6/2009 | Srinivasan | G06Q 30/00 705/26.1 |
| 2010/0179861 A1 * | 7/2010 | Teerilahti | G06Q 30/0278 705/7.33 |
| 2010/0293181 A1 * | 11/2010 | Muller | G06Q 30/06 707/759 |
| 2011/0022525 A1 * | 1/2011 | Swinson | G06Q 30/0278 705/306 |
| 2012/0005045 A1 * | 1/2012 | Baker | G06F 16/335 705/27.2 |
| 2013/0030870 A1 * | 1/2013 | Swinson | G06Q 30/02 705/7.35 |
| 2017/0076515 A1 * | 3/2017 | Nyalamadugu | G06K 7/10366 |

* cited by examiner

| Segment 1 | Segment 2 | Segment 3 | Segment 4 | Segment 5 | Segment 6 | Segment 7 |
|---|---|---|---|---|---|---|
| Omni | Nano | Go | Padmini | Uno | Petra | Rio |
| 800 | EECO | Beat | Ambassador | Palio | Aveo | Rhino |
| Alto | EON | Ritz | Esteem | Aveo UVA | Adventure | VIBE CS |
| Celerio | Matiz | Indica | Pulse | Contessa | Avventura | Optra SRV |
| Zen | A STAR | GETZ | Indica Vista | Quanto | Venture | Escort |
| Wagon R | Spark | Sail UVA | Versa | Sierra | Indigo Marina | Cedia |
| Santro Xing | Estilo | E20 | Accent | Corsa | Astra | TATA TL |
| Swift | i10 | Bolt | Siena | Fiesta | Optra | Fiat 500 |
| EtiosLiva | Indica | Jazz | 1000 | Lancer | Civic | Vectra |
| Dzire | Etios | Fabia | Sail | Scala | DMAX | Kizashi |
| Verna | Brio | Punto | Winger | Fluence | Xenon XT | Forester |
| Bolero | Grand i10 | Cross Polo | MOVUS | Koleos | Octavia Combi | TT |
| Xylo | Micra Active | ZEST | Sumo Grande | Captiva | Aria | Lancer Evolution |
| Qualis | Micra | IKON | Grande DiCOR | Prius | Grand Vitara | RS5 |
| Scorpio | Figo | Sumo | Fusion | 1 Series | Teana | CLS Class |
| Ecossport | Gypsy | Manza | Mobilio | Mini Countryman | Sonata | A7 |
| Duster | Polo | BALENO | Vento | YETI | Accord | Z4 |
| XUV500 | Amaze | BALENO | Tavera | Xtrail | CRV | 6 Series |
| Innova | i20 | Classic | SX4 | Beetle | Touareg | R Class |
| Fortuner | Stile | Fiesta Classic | Optra Magnum | C Class | Outlander | Phaeton |
| X1 | Evalia | THAR | Safari | A4 | SI Class | S Class |
| 3 Series | Ertiga | Sunny | Fluence | Q3 | 370Z | Panamera |
| Q7 | Enjoy | Linea | Camry | V40 Cross Country | 7 Series | |
| Jaguar XJ | Rapid | City | MU7 | 3 Series GT | S6 | RS7 |
| V8 Vantage | Vento | Force One | Mini Cooper | X3 | S80 | Ferrari FF |
| AM Rapide | Verna | Safari | B Class | SLK Class | R8 | |
| | Ciaz | Corolla | Passat | XC90 | X6 | |
| | Terrano | Elantra | Montero | G Class | VOGUE | |

FIGURE 5

| Year | Segment 1 | Segment 2 | Segment 3 | Segment 4 | Segment 5 | Segment 6 | Segment 7 |
|---|---|---|---|---|---|---|---|
| 2015 | 3.65 | 2.96 | 2.75 | 1.91 | 1.95 | 1.58 | 1.42 |
| 2014 | 3.16 | 2.56 | 2.34 | 1.93 | 1.6 | 1.28 | 1.11 |
| 2013 | 3.26 | 2.69 | 2.41 | 2.07 | 1.59 | 1.17 | 1.01 |
| 2012 | 3.5 | 2.86 | 2.6 | 2.09 | 1.82 | 1.45 | 1.21 |
| 2011 | 3.21 | 2.64 | 2.38 | 1.92 | 1.67 | 1.39 | 1.10 |
| 2010 | 2.97 | 2.47 | 2.10 | 1.75 | 1.74 | 1.27 | 1.00 |
| 2009 | 2.73 | 1.99 | 1.98 | 1.62 | 1.46 | 1.15 | 1.11 |
| 2008 | 2.47 | 1.71 | 1.85 | 1.25 | | 1.04 | 1.04 |
| 2007 | 2.36 | 1.61 | | 1.17 | | 1.01 | |
| 2006 | 2.54 | 1.34 | | 1.11 | | 0.91 | |
| 2005 | | 1.20 | | 0.97 | | | |

| Year | Dealer Party % |
|------|----------------|
| 2015 | 3 |
| 2014 | 3 |
| 2013 | 3 |
| 2012 | 3 |
| 2011 | 3 |
| 2010 | 3 |
| 2009 | 3 |
| 2008 | 3 |
| 2007 | 3 |
| 2006 | 3 |
| 2005 | 3 |
| 2004 | 3 |
| 2003 | 3 |

| kms Driven | Sell % | Buy % | Avg % |
|---|---|---|---|
| 0-5K | 5.3 | 6.35 | 5.83 |
| 5K-10K | 3.45 | 4.12 | 3.79 |
| 10-20K | 1.33 | 1.07 | 1.2 |
| 20-30K | 0.94 | 0.8 | 0.87 |
| 30-40K | 0.54 | 0.53 | 0.54 |
| 40-50K | 0 | 0 | 0 |
| 50-75K | -0.53 | -0.53 | -0.53 |
| 75-100K | -2.12 | -1.85 | -1.98 |
| 100-125K | -3.44 | -2.91 | -3.18 |
| 125K-150K | -4.16 | -3.47 | -3.81 |
| 150K+ | -4.88 | -4.02 | -4 |

| Factors/Condition | Excellent | Very Good | Good | Fair | Bad |
|---|---|---|---|---|---|
| Paint and body | Flawless | Minor Scratches | Moderate Scratches, dents | Moderate scratches, Chips, dents, Surface Rust | Damaged, major dents, paint flaws, Rust |
| Frame or unibody | Unaltered | Unaltered | Repaired | Replaced | Damaged |
| Windshield glass, lights, lenses | No Defects | Minor Scratches, Slight Discoloration | Can be repaired | Not repairable | Cracked Windshield, Discolored Lenses |
| Wheels | Flawless | Minor scratches or scrapes | Repairable | Repairable | Major scratches, scrapes, pitting, bent, or dented |
| Upholstery and carpet | Clean/Like New | Minimal Wear | Stained | Faded/Worn | Torn/Burned/Cracked |
| Odor (smoke/mold...) | No Odor | Mildew | Mold | Chemical Compunds | Cigarette & Cigar Smoke |
| Electronics (windows, locks, radio, NAV, etc...) | Fully Functional | Functional With minor faults | Functional With minor faults | Repairs Required | Repairs Required |

USED-VEHICLE ALGORITHMIC PRICING ENGINE METHOD AND SYSTEM

CROSS-REFERENCE TO RELATED APPLICATIONS

This application claims priority to U.S. Provisional Application No. 62/277,924, filed on 12 Jan. 2016. This provisional application is incorporated by reference in its entirety.

This application claims priority to U.S. Provisional Application No. 62/442,157, filed on 4 Jan. 2017. This provisional application is incorporated by reference in its entirety.

This application claims priority to U.S. Provisional Application No. 62/900,643, filed on 15 Sep. 2019. This provisional application is incorporated by reference in its entirety.

This application is a continuation-in-part of U.S. patent application Ser. No. 15/398,304. U.S. patent application Ser. No. 15/398,304 claim priority to U.S. Provisional Application No. 62/442,157, filed on 4 Jan. 2017 and U.S. Provisional Application No. 62/277,924, filed on 12 Jan. 2016. U.S. patent application Ser. No. 15/398,304 application is incorporated by reference in its entirety.

BACKGROUND

1. Field

This description relates to the field of distributing an estimated monetary value of a used vehicle on the Internet and more particularly to a system, method and article of manufacture of a used-vehicle algorithmic pricing engine.

2. Related Art

Generally, when someone wishes to purchase a used vehicle (e.g. an automobile, etc.), the user can seek the lowest price. Additionally, when selling a used vehicle, the user can seek the highest price possible. It is also a common scenario that when someone is buying a used automobile from an individual seller, the buyer can acquire the used vehicle at a much lower price than buying from an automobile dealer considering the profit margin of the dealer in the transitional transaction. Similarly, when a user is selling a used vehicle, the used vehicle can fetch a better value when the sale is made to an individual buyer than an automobile dealer as the automobile dealer would try and acquire the vehicle at a lower price and add his/her profit margin during the transitional sale. However, individual users may not have the information to maximize their quoted prices to offer their used vehicle at. Additionally, a buying non-professional user may not have sufficient information to determine a reasonable price to purchase a used vehicle.

BRIEF SUMMARY OF THE INVENTION

In one aspect, a computerized system for distributing an estimated monetary value of a used vehicle on the Internet, the Internet including a server and a computer with a monitor, the used vehicle being associated with a seller of the used vehicle, which used vehicle is offered for sale to a used-vehicle retailer, the system including: a server including a category-agnostic pricing engine that evaluates the fair price range of any used automobile and is configured to implement the following steps: identify the seller of the used vehicle; identify a used-vehicle retailer to offer the used vehicle to for sale; determine a mileage of the used vehicle; determine a condition of the used vehicle; collect a set of samples of one or more used-vehicle types, wherein the set of samples includes a make of each used-vehicle type, a model of each used-vehicle type and a year of production of each vehicle type; collect a set of used-vehicle sales data for the set of samples of the one or more used-vehicle types for a specified period, and wherein the used-vehicle sales data includes a sale price statistic for the set of samples as a function of at least vehicle mileage and vehicle condition; generate a depreciation curve for each used-vehicle type based on the used-vehicle sales data of each sampled used-vehicle type; group each sampled used-vehicle types with a set of similar depreciation patterns into a depreciation segment, wherein the depreciation segment includes a group of vehicle types that present a similar depreciation pattern within specified thresholds of the used-vehicle sales data; match the used vehicle of the seller to the depreciation segment; determine a monetary value of the used vehicle based on the depreciation segment; provide a web page that includes a display of the monetary value of the used vehicle based on the depreciation segment; receive a request for the web page from either the seller's computing device or the used-vehicle retailer's computing device; configure the web page to display the monetary value of the used vehicle based on the depreciation segment; and communicate the web page configured to display the monetary value of the used vehicle to either the seller's computing device or the used-vehicle retailer's computing device.

BRIEF DESCRIPTION OF THE DRAWINGS

FIG. 5 illustrates an example table that provides example vehicle types grouped into depreciation segments, according to some embodiments.

FIG. 6 illustrates an example table showing the application of a buy/sell parameter to the various elements of the depreciation segments of table 500, according to some embodiments.

FIG. 7 illustrates an example table providing an implementation of a party factor, according to some embodiments.

FIG. 8 illustrates an example table illustrates an example integration of a mileage factor, according to some embodiments.

FIG. 9 illustrates an example table implemented to determine a condition of a vehicle, according to some embodiments.

Figure 1:
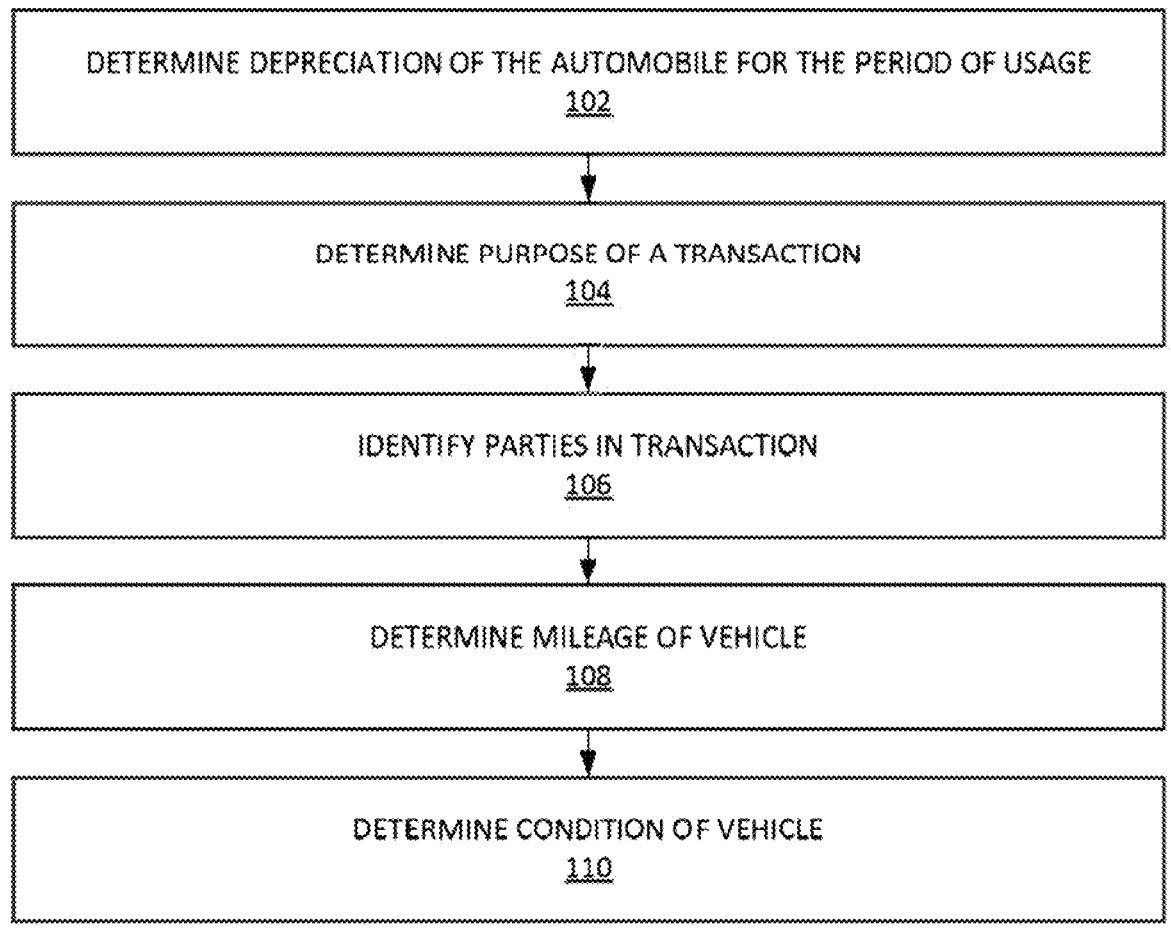
FIG. 1 illustrates an example process for calculating a price for a vehicle, according to some embodiments.

The Figures described above are a representative set, and are not an exhaustive with respect to embodying the invention.

DESCRIPTION

Disclosed are a system, method, and article of manufacture for methods and systems of a used-vehicle algorithmic pricing engine. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

On-board diagnostics (OBD) is an automotive term referring to a vehicle's self-diagnostic and reporting capability. OBD systems give the vehicle owner or repair technician access to the status of the various vehicle subsystems.

Exemplary Methods

An algorithmic pricing engine is provided. The pricing engine can evaluate a fair price range of any used product (e.g. automobiles, boats, motorcycles, scooters, tools, bicycles, toys, exercise equipment, airplanes, etc.). For the sake of simplicity, examples used herein can evaluate the prices of used vehicles. However, it is noted that other product prices can be evaluated in other example embodiments. A vehicle can be any machine used for transportation (e.g. cars, motorcycles, trucks, light trucks, buses, vans, boats, airplanes, helicopters, etc.).

The pricing engine can utility a variety of parameters to calculate the price of a used automobile. The pricing engine can use various statistical methodologies (e.g. as provided infra) can be utilized.

FIG. 1 illustrates an example process 100 for calculating a price for a vehicle, according to some embodiments. In step 102, process 100 can determine a depreciation (e.g. in monetary terms) of a vehicle for a specified period. In step 104, process 100 can determine a purpose of the transaction. For example, process 100 can determine the transaction type (e.g. a vehicle purchase, a vehicle sale, etc.).

In step 106, process 100 can identify the various parties in the transaction. It is noted that a buyer would like a lowest price and a seller would prefer a highest price possible. A party to process can be an individual or a used automobile dealer. It is noted that a purchasing party of a used automobile can often acquire a lower price from an individual seller than from a professional automobile dealership (e.g. considering the profit margin of the dealer in the transitional transaction). Similarly, when one is selling a used vehicle, the vehicle can fetch a higher value when the sale is made to an individual buyer than an automobile dealer as the automobile dealer would try and acquire the vehicle at a lower price and add a profit margin during the transitional sale.

In step 108, process 100 can determine the mileage of the vehicle. It is noted that vehicles with lower mileage generally fetch a higher value than a vehicle with higher mileage. Hence, the mileage of the vehicle can be an important parameter in evaluating the fair price.

In step 110, process 100 can determine the condition of the vehicle. A well-maintained vehicle generally fetches a higher value than a vehicle that is poorly maintained. It is noted that the vehicle's parameters (e.g. mileage, condition, ownership verification, etc.) can be determined/verified by various parties (e.g. vehicle owner, third party services, governmental agencies, etc.). For example, a system implementing process 100 can query an API of a commercial web-based service that supplies vehicle history reports to individuals and businesses on used vehicles. In some embodiments, process 100 can first calculate the depreciation of the vehicle; the period of usage and the other parameters can then be used to increase or decrease the value of a vehicle.

Figure 2:
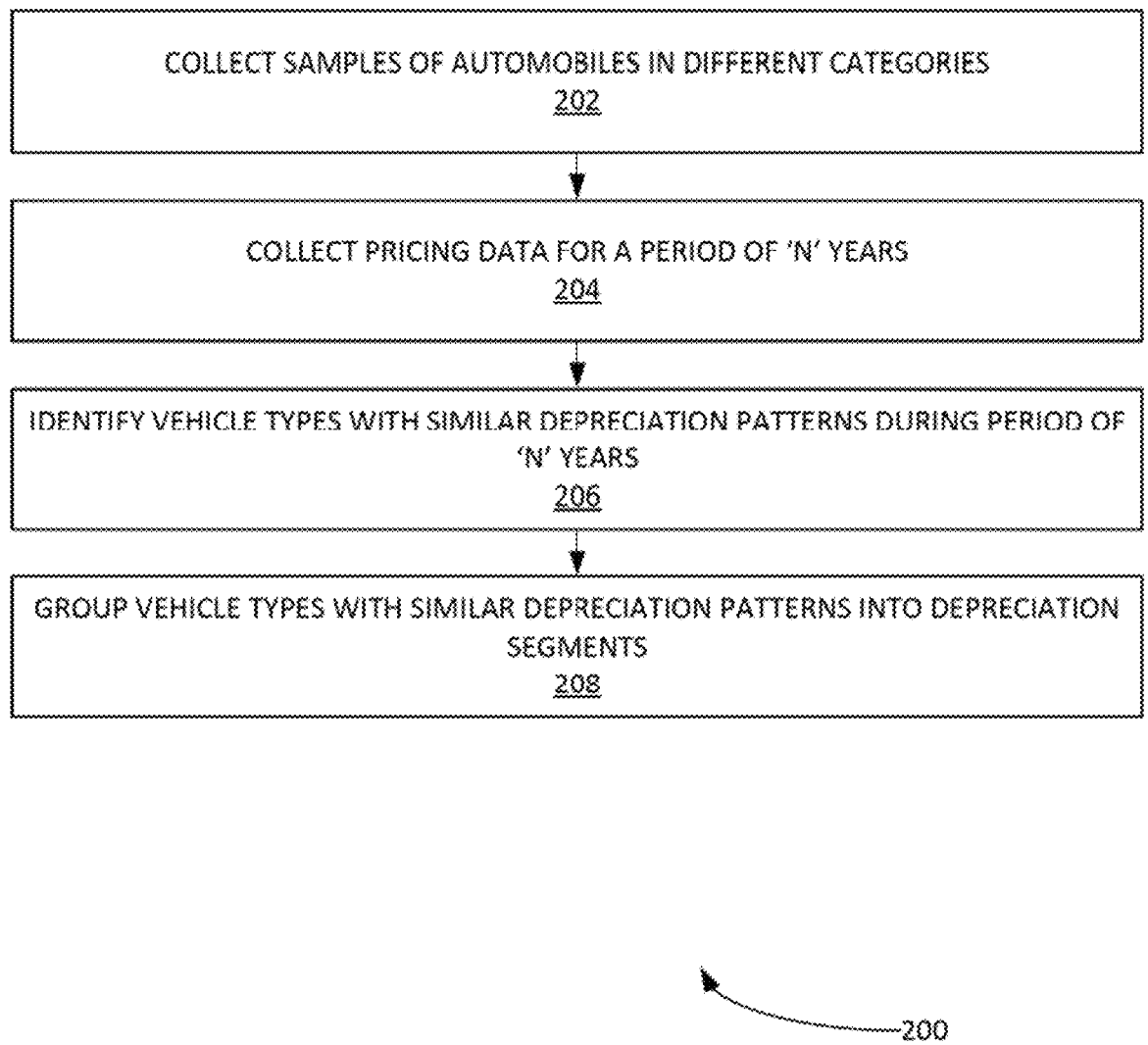
FIG. 2 illustrates an example process of grouping vehicle types based on similar depreciation patterns, according to some embodiments.

FIG. 2 illustrates an example process 200 of grouping vehicle types based on similar depreciation patterns, according to some embodiments. In step 202, process 200 can collect samples of vehicles types (e.g. by make/model, year of production, etc.). The samples can include data used to generate a depreciation curves of sample models. Example data for step 202 can include vehicle sale data, vehicle type data, geographic data associated with a vehicle sale, sale dates, parties to a sale, etc. For example, in step 204, process 200 can collect pricing data for 'N' period. In one example, 'N' can be a specified number of years. In step 206, process 200 can identify vehicle types with similar depreciation patterns during period of 'N' years. Various similarity measures and/or clustering algorithms/techniques can be used to define similar depreciation patterns. In step 208, process 200 can group vehicle types with similar depreciation patterns into depreciation segments. A depreciation segment can be a group of vehicle types that present similar depreciation patterns within specified thresholds of specified parameters.

In some embodiments, it is noted that the price generated can further be refined using the following parameters. Location can be used to refine a vehicle's price. User can select from a plurality of locations obtain the fair price in his/her region. The price of a vehicle varies for different locations depending upon the regional government policies and taxes, environmental condition, infrastructure of the city, demand and supply of automobiles.

Exterior Color can be used to refine a vehicle's price. A color attribute (e.g. an exterior color, an interior color, etc.) can contribute to the price of the vehicle, and a buyer can select the desired exterior color of the vehicle. A seller can specify a vehicle's color as well.

Number of Owners can be used to refine a vehicle's price. A user can also select the number of times that a vehicle has been bought and sold prior to the present transition. In this way, as the number of past owners increases the value of vehicle depreciates more due to different usage behavior of different users.

Accident History can be used to refine a vehicle's price. A user may select if the vehicle has been through minor or major accident. Detailed conditions of Vehicle components can be used to refine a vehicle's price. For example, using four given conditions (e.g. 'Fair', 'Good', 'Very Good' and 'Excellent'), a user can select the appropriate condition of various components of the vehicle (e.g. exterior, interior, steering mechanism, electrical system etc.).

Figure 3:
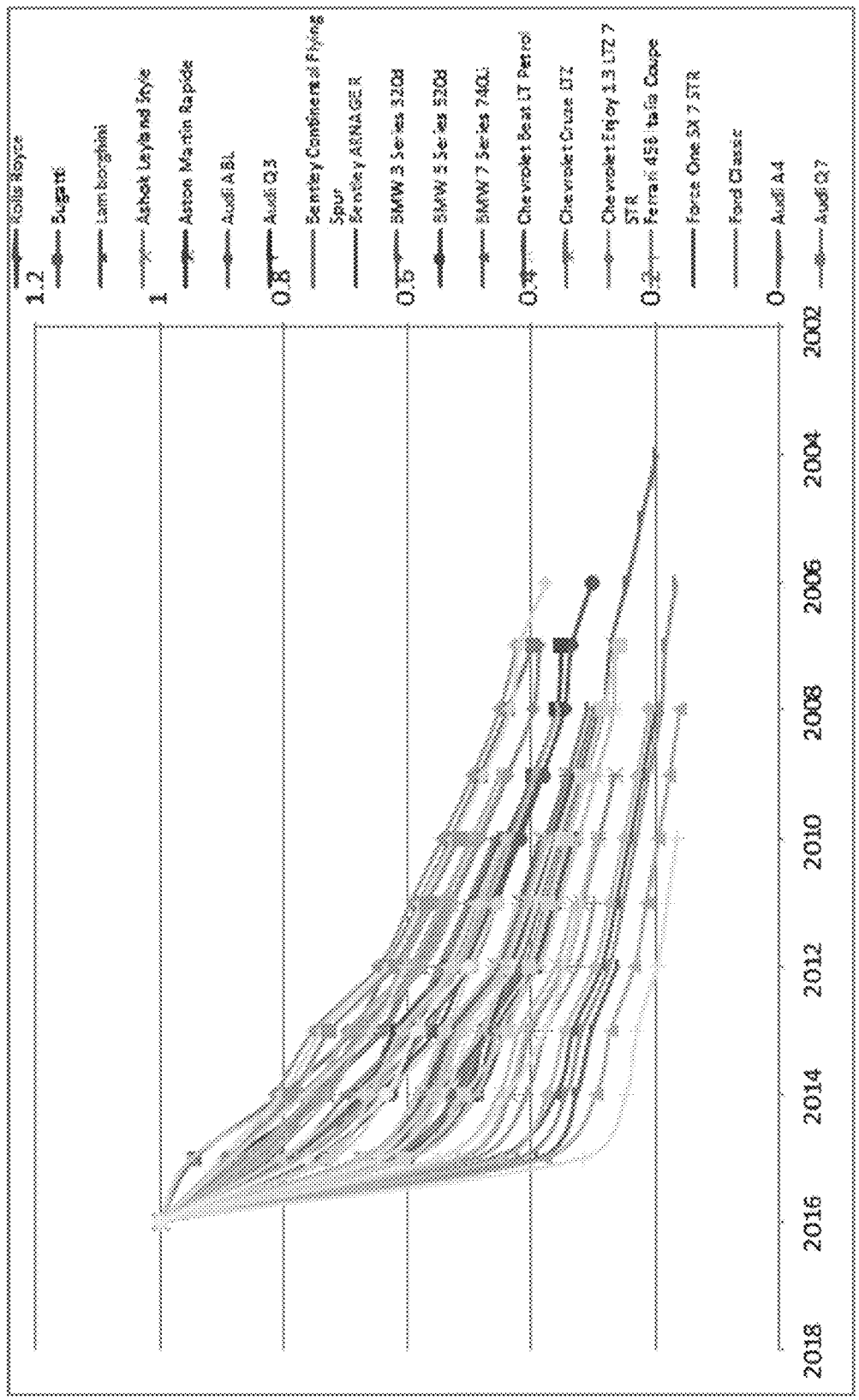
FIG. 3 illustrates an example graph of depreciation patterns of various vehicle types as a function of time, according to some embodiments.
Figure 4:
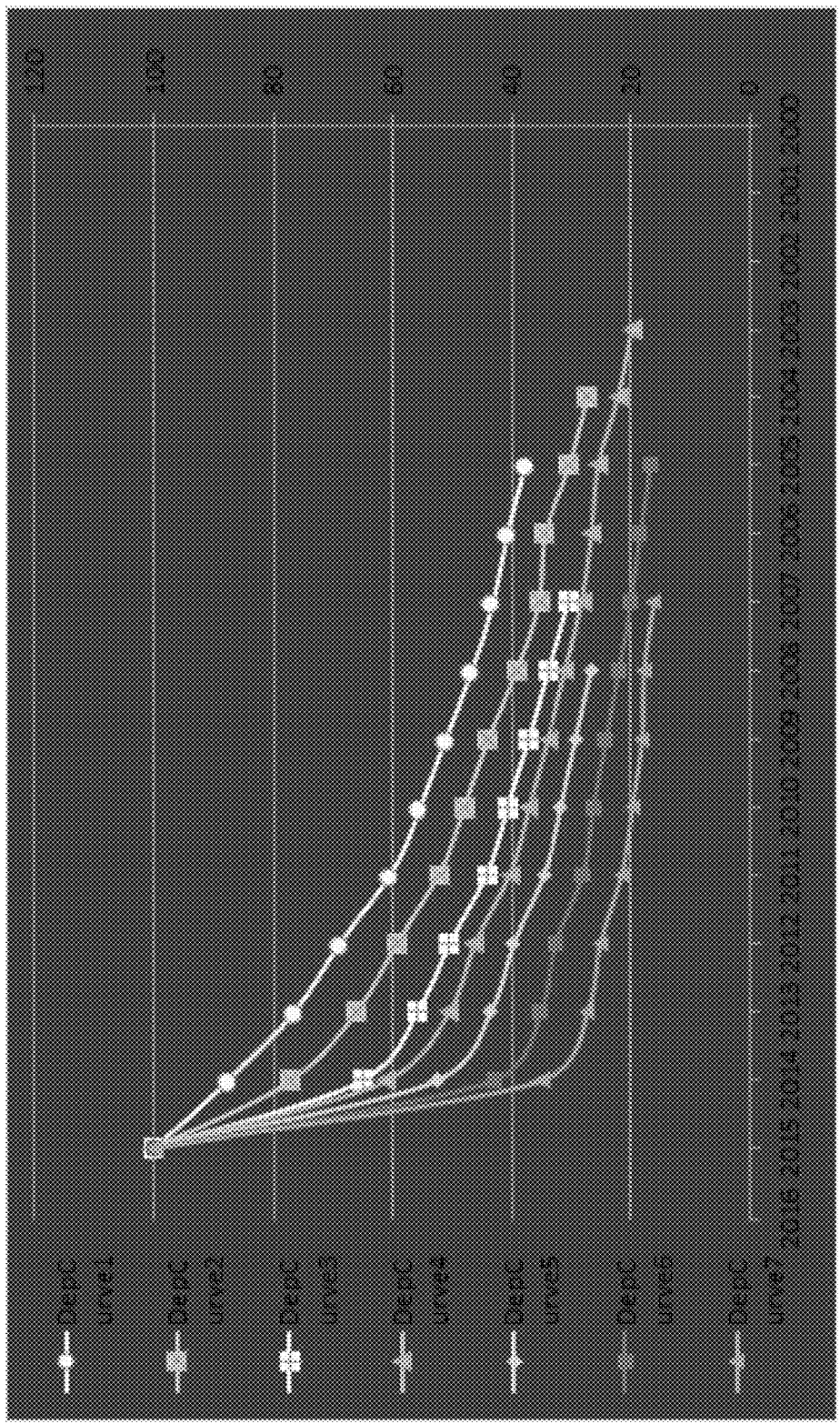
FIG. 4 illustrates another example graph of various vehicle types grouped based similarities between their respective depreciation patterns (as a function of time), according to some embodiments.

FIG. 3 illustrates an example graph 300 of depreciation patterns of various vehicle types as a function of time (e.g. years). The information provided by FIG. 3 can be used by process 200. FIG. 4 illustrates another example graph 400 of various vehicle types grouped based similarities between their respective depreciation patterns (as a function of time), according to some embodiments. Graphs 300 and/or 400 can be generated for various geographic regions (e.g. city, state, county, country, ad hoc regions, etc.).

FIG. 5 illustrates an example table 500 that provides example vehicle types grouped into depreciation segments, according to some embodiments. In the present example, based on these depreciation segments, we mapped the whole collection of automobiles in India into these seven segments. Table 500 can be generated from the information provided and/or used to generate graphs 300 and/or 400.

FIG. 6 illustrates an example table 600 showing the application of a buy/sell parameter to the various elements of the depreciation segments of table 500, according to some embodiments. For example, after determining the depreciated value of a vehicle, the buy/sell parameter can be applied. After the addition/subtraction of the buy/sell parameter, the party factor can be implemented. In the present example of table 600, based on the empirical analysis, the variation in price of a vehicle when the transaction is with an automobile dealer, is shown to be three percent (3%) as provided in FIG. 7. FIG. 7 illustrates an example table 700 providing an implementation of a party factor, according to some embodiments.

FIG. 8 illustrates an example table 800 illustrating an example integration of a mileage factor, according to some embodiments. After incorporation of the dealer parameter (e.g. as provided supra), a parameter for the mileage of the vehicle can then be added. Mileage of a vehicle can be measured in various distance standard units (e.g. kilometers, miles, meters, etc.).

FIG. 9 illustrates an example table 900 implemented to determine a condition of a vehicle, according to some embodiments. It is noted that vehicle condition can be a parameter as discussed supra. In some examples, the condition of the vehicle can be weighted to play a vital role in determining the value of the vehicle. However, the condition of a vehicle can be a subjective determination. Hence, table 900 illustrates an example methodology to determine the condition of a vehicle. Table 900 illustrates an example method that can be used to determine the condition of the vehicle.

Figure 10:
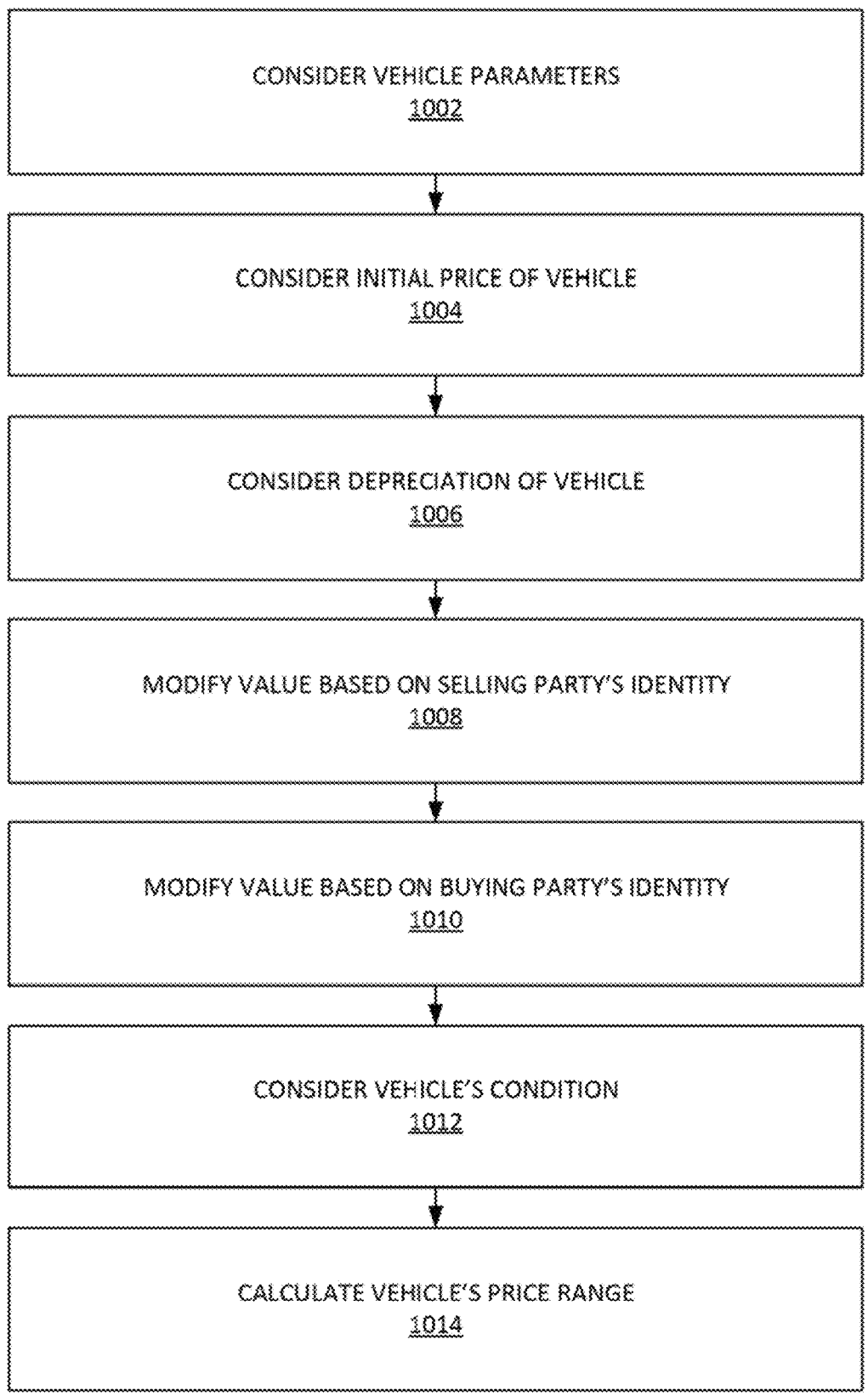
FIG. 10 illustrates an example process for estimating the price of a vehicle, according to some embodiments.

FIG. 10 illustrates an example process 1000 for estimating the price of a vehicle, according to some embodiments. In step 1002, process 1000 can consider vehicle parameters. In step 1004, process 1000 can consider initial price of vehicle. In step 1006, process 1000 can consider depreciation of vehicle. In step 1008, process 1000 can modify value based on selling party's identity. In step 1010, process 1000 can modify value based on buying party's identity. In step 1012, process 1000 can consider vehicle's condition. In step 1014, process 1000 can calculate vehicle's price range.

An example implementation of process 1000 is now provided. Consider an Audi® A4 2.0 TDi 2011. The Audi® A4 is being sold to an individual buyer with 30000 Kilometers on the odometer and very good condition. Consider the initial price of the vehicle to be three (3) million Indian Rupees. Consider, after depreciation for four years, the price of the vehicle stands to be two (2) million Indian Rupees (it is noted that other national currencies can be used in other example embodiments). An Audio® A4 is in segment five (5) of the depreciation chart and table provided supra, and it would have depreciated thirty-three-point thirty-three percent (33.33%) over the period of four (4) years. The owner is selling the vehicle, so process one-thousand (1000) adds a four percent (4%) value, and the value of the vehicle is now two point zero eight (2.08) million Indian Rupees. The purchaser is an individual buyer. Accordingly, there will be no change in the value of the vehicle and the value stands at two point zero eight (2.08) million Indian Rupees at the end of this step of the calculation. Considering the condition of the vehicle, the vehicle is in very good condition according to the example considered. This state adds a value of two percent (2%) to the existing value of the vehicle. Now after this step of the calculation, the value of the vehicle stands at 2,121,600 Indian Rupees. To estimate the fair price range, process one-thousand (1000) adds and subtracts three percent (3%) to the final value of the vehicle. This three percent (3%) can be termed as error factor to the calculation and now the fair price range for this transaction is 2,057,952 Indian Rupees to 2,185,248 Indian Rupees.

Figure 11:
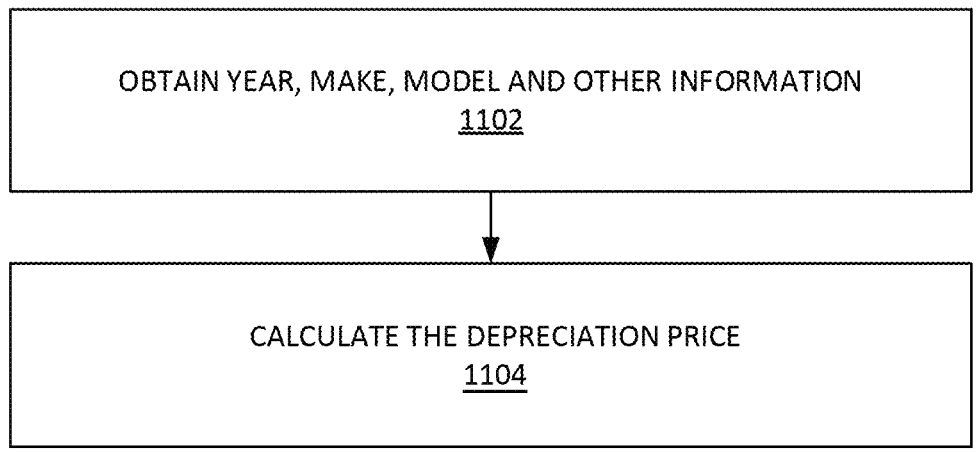
FIG. 11 illustrates an example process for estimating the price of a vehicle, according to some embodiments.

FIG. 11 illustrates an example process 1100 for estimating the price of a vehicle, according to some embodiments. Process 1100 can use various inputs such as, inter alia: vehicle year, vehicle make, vehicle model, vehicle condition, transaction purpose, vehicle 'mileage', transaction party(s), etc. Process 1100 can determine a vehicle depreciation segment based on the vehicle's make/model. Process 1100 can determine a depreciation percentage using the vehicle's year and/or vehicle make/model. Process 1100 can also determine a depreciation percentage from a condition table. From these two depreciation percentages, process 1100 can determine a depreciation price. The depreciation price can be stored as a variable (e.g. tempPrice1, etc.) in a data store of a computing system implementing process 1100. Other depreciation percentages can be determined based on the other inputs. For example, process 1100 can determine a depreciation percentage from the transaction purpose input. This can be used to calculate another depreciation price (e.g. stored as tempPrice2, etc.). Process 1100 can determine a depreciation percentage from the vehicle mileage input. This can be used to calculate another depreciation price (e.g. stored as tempPrice3, etc.). Process 1100 can determine a depreciation percentage based on a party identity table. Accordingly, this can be used to calculate another depreciation price (e.g. a final depreciation price).

It is noted that, in process 1100, the calculation of the deprecation price can be iterative. For example, process 1100 can take a previously calculated depreciation price and modify it using a next depreciation percentage from a next considered input. The tables provide supra can be used by process 1100

Exemplary Computer Architecture and Systems

Figure 12:
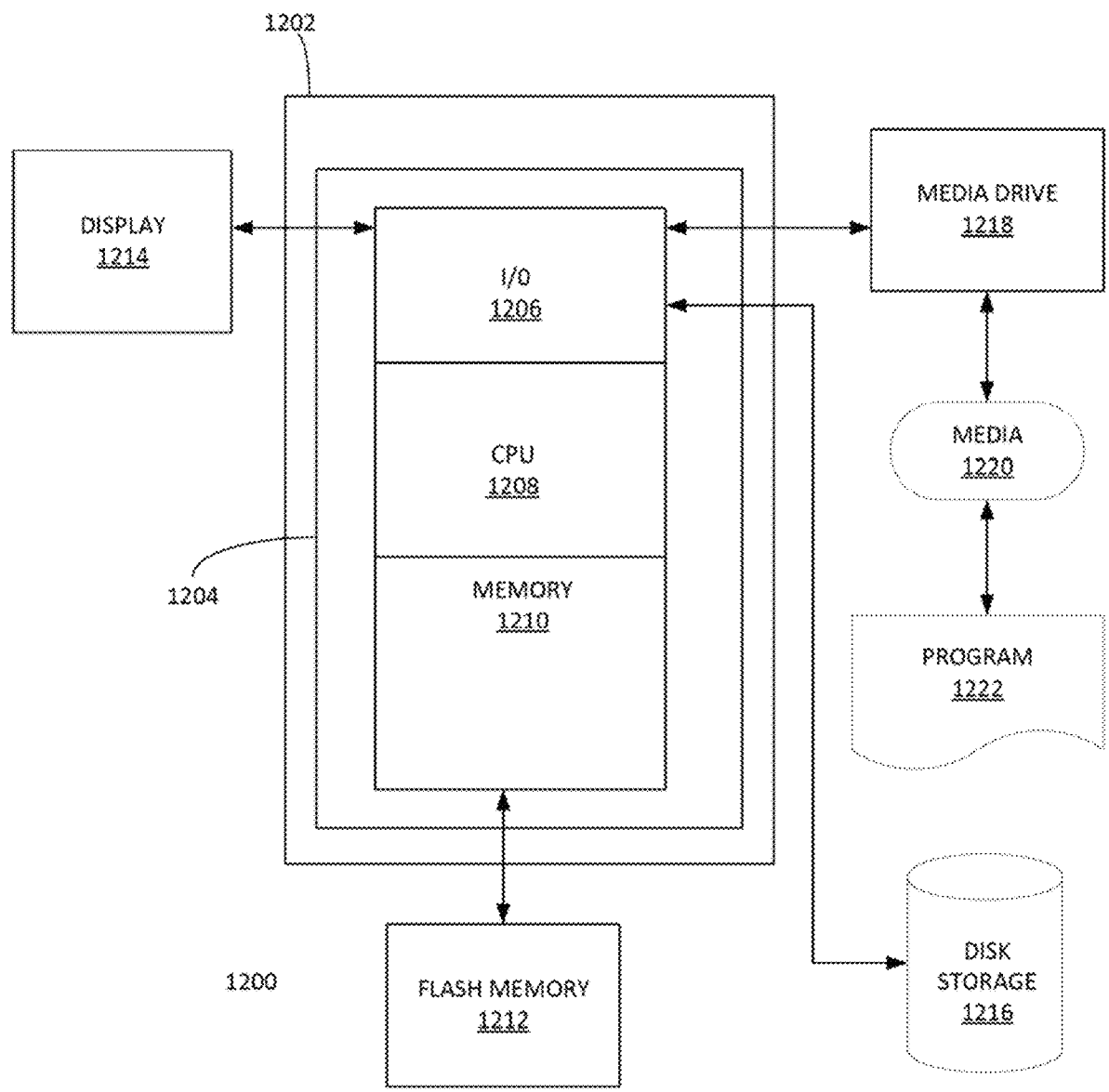
FIG. 12 depicts an exemplary computing system that can be configured to perform any one of the processes provided herein.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 13:
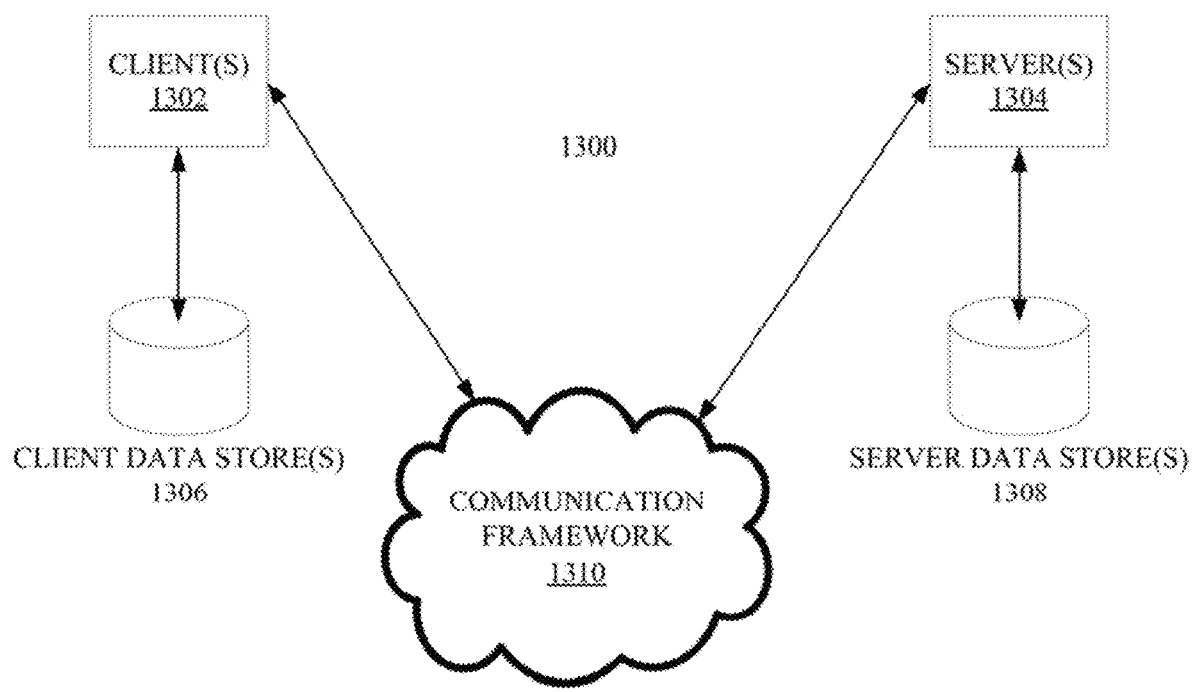
FIG. 13 is a block diagram of a sample computing environment that can be utilized to implement various embodiments.

FIG. 13 is a block diagram of a sample computing environment 1300 that can be utilized to implement various embodiments. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). One possible communication between a client 1302 and a server 1304 may be in the form of a data packet adapted to be transmitted between two or more computer processes. The system 1300 includes a communication framework 1310 that can be employed to facilitate communications between the client(s) 1302 and the server(s) 1304. The client(s) 1302 are connected to one or more client data store(s) 1306 that can be employed to store information local to the client(s) 1302. Similarly, the server(s) 1304 are connected to one or more server data store(s) 1308 that can be employed to store information local to the server(s) 1304. In some embodiments, system 1300 can instead be a collection of remote computing services constituting a cloud-computing platform.

Additional Methods and Processes

Figure 14:
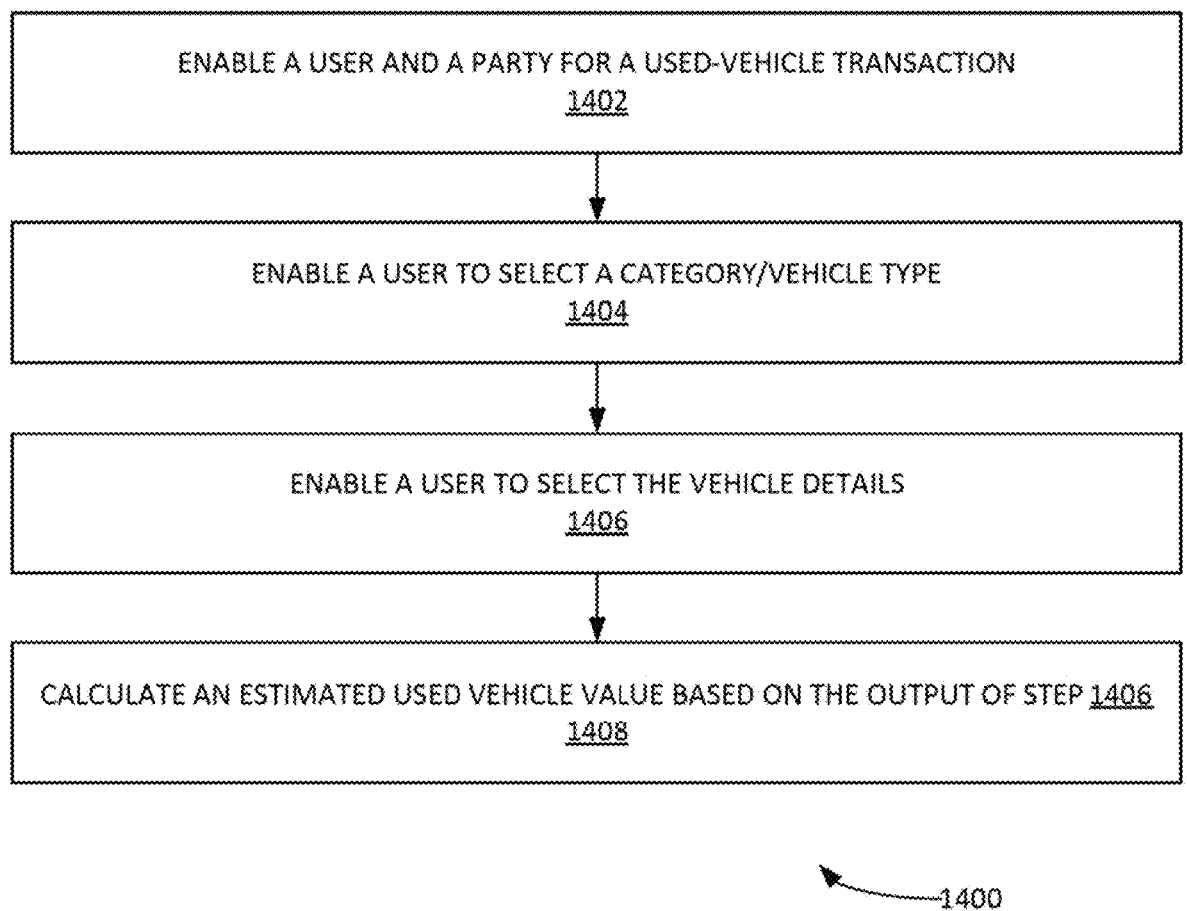
FIG. 14 illustrates an example process for estimating a current vehicle valuation, according to some embodiments.

FIG. 14 illustrates an example process 1400 for estimating a current vehicle valuation, according to some embodiments. In step 1402, process 1400 can enable a user to select a purpose (e.g. whether the user wants to buy or sell a used vehicle) and a party (e.g. an identity of the entity on the other end of the transaction such as an individual, used automobile dealer, etc.). In step 1404, process 1400 can enable a user to select a category/vehicle type (e.g. a car, a motorcycle, a scooter, a bicycle, an airplane, etc.). In step 1406, process 1400 can enable a user to select the vehicle details (e.g. make, model, year of production, trim attributes, mileage (e.g. miles and/or kilometers completed), etc. In step 1408, process 1400 can calculate an estimated used vehicle value based on the output of step 1406.

Figure 15:
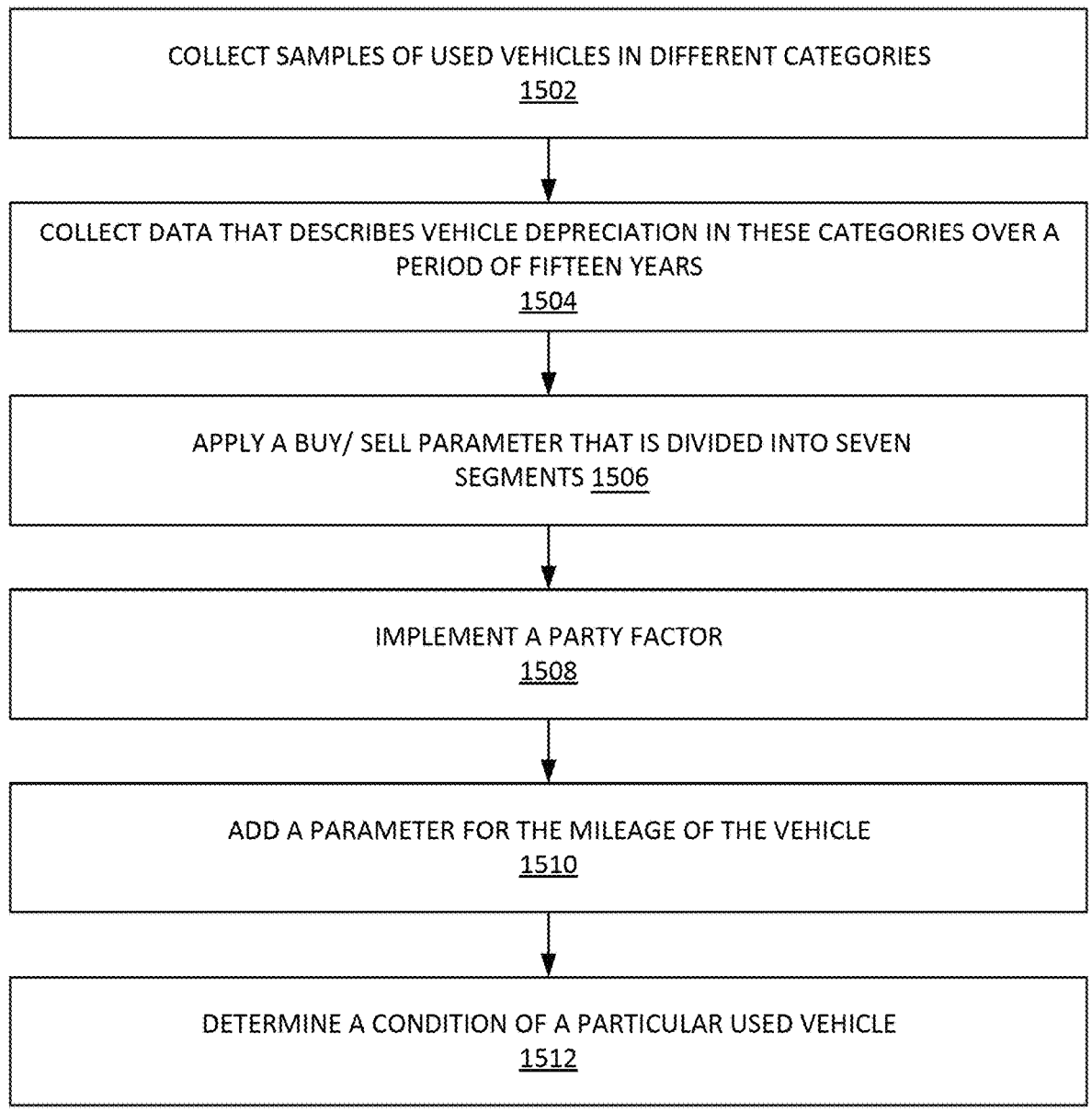
FIG. 15 illustrates an example process, according to some embodiments.

FIG. 15 illustrates an example process 1500, according to some embodiments. In step 1502, process 1500 can collect samples of used vehicles in different categories (e.g. car, motorcycle, scooter, bicycles, airplanes, etc.). In step 1504, process 1500 can collect data that describes vehicle depreciation in these categories over a period of fifteen (15) years. In step 1506, process 1500 can use a set of depreciation curves based on the behavior shown by different vehicles in the outcome of step 1504. In step 1506 after determining the depreciated value of the vehicle, process 1500 can apply a buy/sell parameter that is divided into seven (7) segments. In step 1508, process 1500 can, after the addition/subtraction of the buy/sell parameter, implement a party factor. For example, the party factor can be based on a transaction entity identity. For example, based on an empirical analysis, it can be determined that the variation in price of a used vehicle when the transaction is with a used-automobile dealer, is three percent (3%). In step 1510, process 1500 can, after incorporation of the entity identity (e.g. a dealer parameter, etc.), add a parameter for the mileage of the vehicle. Mileage of a vehicle can be measured in kilometers in most nations, but any measure of distance can be utilized in various embodiments. In step 1512, process 1500 can determine a condition of a particular used vehicle. It is noted that the condition of a vehicle can contribute to the estimated value of a used vehicle. In one example, a table can be used to determine the condition of the vehicle (e.g. see U.S. Provisional Patent Application No. 62/277,924, filed on 12 Jan. 2016 and incorporated herein by reference).

In some examples, an additional current value evaluation can include a set of additional tools to refine prices by selecting location, body color, number of previous owners, accident history and detailed conditions of other specified parameters. In one example, a combination of state and cities in a geographic region can be used. The depreciation behavior of vehicles in all the cities/states with respect to depreciation in a specified city/state can be determined. The depreciation value of a particular/city can be determined according to the following equation: a location/city=State depreciation+Tier type depreciation (whichever tier the city falls in). Exterior colors can be used to refine a current estimated price of a used vehicle. Empirical historical sales data can be used to determine weightings to increase or decrease a current value based on exterior color. A number of historical owners can be used to refine a current estimated price of a used vehicle. Empirical historical sales data can be used to determine weightings to increase or decrease a current value based on number of historical owners. An accident history can be used to refine a current estimated price of a used vehicle. Empirical historical sales data can be used to determine weightings to increase or decrease a current value based on the used vehicle's accident history. A detailed condition of a used vehicle's components can be used to refine a current estimated price of a used vehicle. The condition of various components can be different for a given used vehicle. For example, the interior can be in excellent state while exterior has minor scratches and dents and classified in 'fair' condition. A functionality to select different condition for different components of an automobile can be a table (e.g. see U.S. Provisional Patent Application No. 62/277,924).

It is noted that in various embodiments, utilities and/or other information regarding a used vehicle can be provided (e.g. via a web page and/or mobile application page). In this way, various details about the pricing of the vehicle as can be provided to a potential buyer (e.g. a used-vehicle retailer, etc.) such that an informed decision about selling/buying a used automobile can be made. Example details include a Valuation Report. The Valuation Report can be a pricing report. The Valuation Report can be generated using the monetary value calculated by the processes provided herein and a median value of sold and listing prices of selected make/model/year combination/type (MMYT) for last sixty (60) days, ninety (90) days and/or lifetime of similar used vehicles (e.g. same make/model, condition, etc.). This can enable a user to determine various statistical price parameters that have been paid for the given vehicle in the specified time periods, in addition to an estimated current market value. This report can be downloaded, printed, sent by email, shared on social media, posted to a webpage, etc.

In some examples, a vehicle valuation report can be further divided in two types such as: Basic and Premium. A Basic report can provide an estimated current value. A Premium report can include an estimated current vehicle value for: a price of new vehicle now (e.g. current market price); a value of the vehicle in the year(s) of past purchases of the used vehicle; a total cost of ownership if the vehicle is purchased at estimated current vehicle value (e.g. can include what others paid for this MMYT combination, etc.); a vehicle expert's reviews and rating for the vehicle's MMYT; and/or median values of sold and listing prices of a selected MMYT combination for a specified time period. The price for a new vehicle can be the current market value if a new vehicle is purchased of a given MMYT combination. This can provide the user an idea of how much more he/she needs to pay if he/she would like to purchase a new vehicle as compared to an old vehicle at the current estimated vehicle valuation. The Total Cost of Ownership can be the cost the owner of the vehicle of a given MMYT combination is estimated to bear for next five (5) years (e.g. in maintenance, fuel, tire changes etc.) if the vehicle is purchased at the current estimated vehicle valuation.

Additional Material

There are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.

2. Bayesian Analysis as, for example, in "Bayesian Data Analysis" by A Gelman, 1. B. Carlin, H. S. Stern and D. B. Rubin, Chapman and Hall 1995; Chapter 7, where several sampling designs are discussed.

3. Artificial Intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15,16,19 and 20, where population models are developed from acquired data samples.

It is noted that these statistical methodologies are for exemplary purposes and other statistical methodologies can be utilized and/or combined in various embodiments. These statistical methodologies can be utilized elsewhere (e.g. in process 100, other processes provided herein, etc.), in whole or in part, when appropriate as well.

Additional Systems

Figure 16:
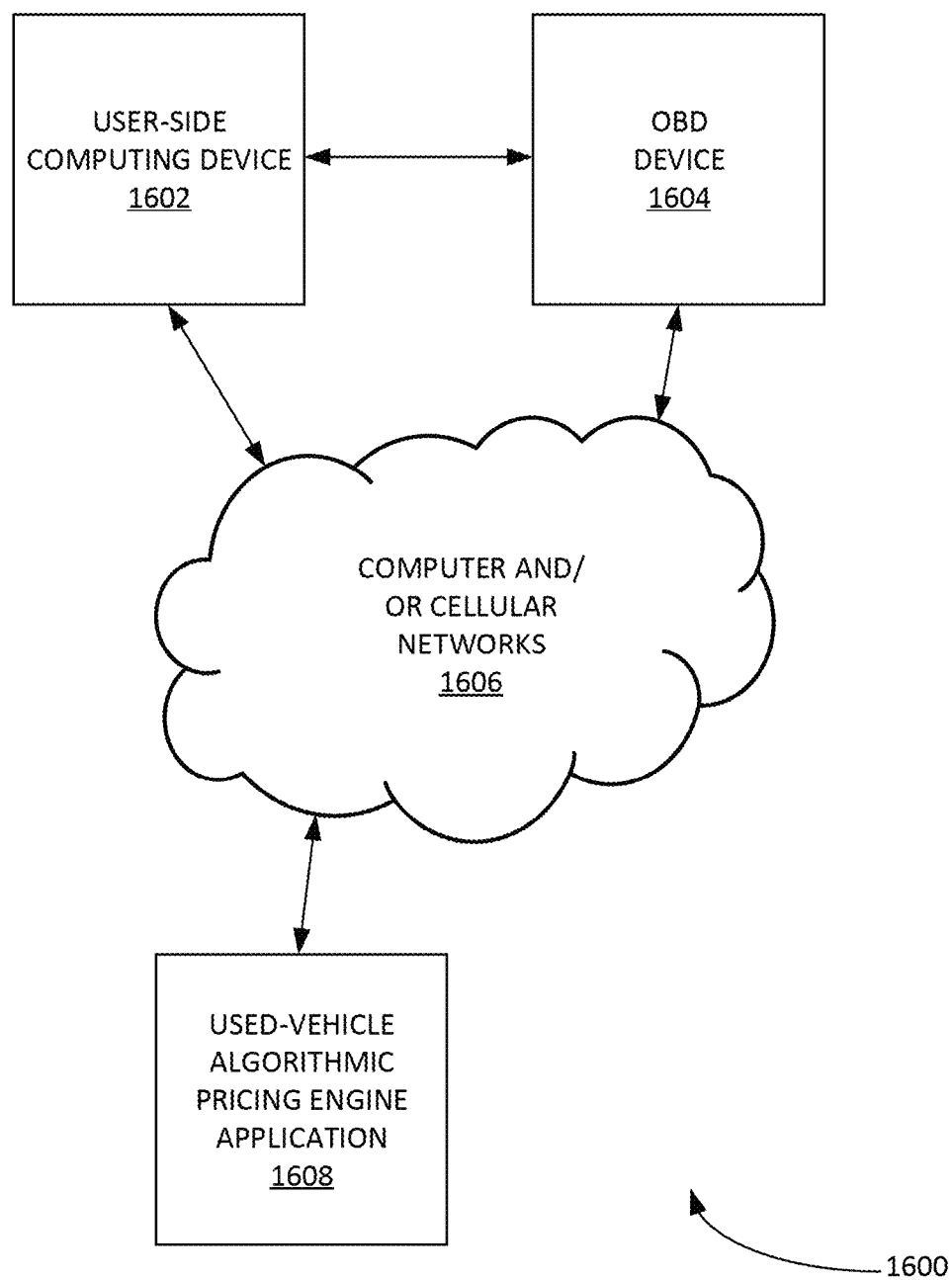
FIG. 16 illustrates an example used-vehicle algorithmic pricing engine system, according to some embodiments.

FIG. 16 illustrates an example used-vehicle algorithmic pricing engine system, according to some embodiments. System 1600 includes a mobile device 1602 with a used-vehicle algorithmic pricing engine application. The used-vehicle algorithmic pricing engine application can obtain the data for implementing the processes provided supra from a user input and/or OBD device 1604 via computer and/or cellular data networks 1606. OBD systems give the vehicle owner or repair technician access to the status of the various vehicle subsystems. In some embodiments, mobile device applications allow mobile devices such as cell phones and tablets to display and manipulate the OBD data accessed via USB adaptor cables, BLUETOOTH or WiFi adapters plugged into the car's OBD connector. The OBD devices enable a vehicle's OBD port to stream data directly to the Internet via a cellular connection and/or directly to used-vehicle algorithmic pricing engine application. Used-vehicle algorithmic pricing engine application 1608 can then implement the processes provided supra.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system for distributing an estimated monetary value of a used vehicle on the Internet, the Internet including a server and a computer with a monitor, the used vehicle being associated with a seller of the used vehicle, which used vehicle is offered for sale to a used-vehicle retailer, the system comprising:
a used-vehicle algorithmic pricing engine application operative in one or more mobile devices to:
collect a data set related to a condition of the used vehicle from an on-board diagnostics (OBD);
collect another data set of information about the used vehicle uploaded via the used-vehicle algorithmic pricing engine application implemented in a mobile device, wherein the mobile device is communicatively coupled with the OBD device;
the server comprising a category-agnostic pricing engine that evaluates the fair price range of any used automobile and is configured to:
identify the seller of the used vehicle;
identify a used-vehicle retailer to offer the used vehicle to for sale;
determine a mileage of the used vehicle;
determine a condition of the used vehicle;
collect a set of samples of one or more used-vehicle types, wherein the set of samples comprises a make of each used-vehicle type, a model of each used-vehicle type and a year of production of each vehicle type;
collect a set of used-vehicle sales data for the set of samples of the one or more used-vehicle types for a specified period, and wherein the used-vehicle sales data comprises a sale price statistic for the set of samples as a function of at least vehicle mileage and vehicle condition;
generate a depreciation curve for each used-vehicle type based on the used-vehicle sales data of each sampled used-vehicle type;
group each sampled used-vehicle type with a set of similar depreciation patterns into a depreciation segment, wherein the depreciation segment comprises a group of vehicle types that present a similar depreciation pattern within specified thresholds of the used-vehicle sales data;
match the used vehicle of the seller to the depreciation segment;
determine a monetary value of the used vehicle based on the depreciation segment;
provide a web page that includes a display of the monetary value of the used vehicle based on the depreciation segment;
receive a request for the web page from either a seller's computing device or a used-vehicle retailer's computing device;
configure the web page to display the monetary value of the used vehicle based on the depreciation segment; and
communicate the web page configured to display the monetary value of the used vehicle to either the seller's computing device or the used-vehicle retailer's computing device.

2. The computerized system of claim 1, wherein the used-vehicle sales data further comprises geographic data associated with a set of vehicle sales of the used-vehicle type.

3. The computerized system of claim 2, wherein the used-vehicle sales data further comprises a set of sale dates associated with the set of vehicle sales of the used-vehicle type.

4. The computerized system of claim 3, wherein the used-vehicle sales data further comprises a set of parties associated with the set of vehicle sales of the used-vehicle type.

5. The computerized system of claim 4, wherein a clustering algorithm is used to group each sampled used-vehicle type with a set of similar depreciation patterns into a depreciation segment.

6. The computerized system of claim 1, wherein the used vehicle comprises an automobile.

7. The computerized system of claim 1, wherein the used vehicle comprises a motorcycle.

8. The computerized system of claim 1, wherein the used vehicle comprises an airplane.

9. The computerized system of claim 1, wherein an exterior color of the used vehicle, a number of historical owners of the used vehicle, an accident history of the used vehicle, and a detailed condition of vehicle components of the used vehicle are used to weight the monetary value of the used vehicle.

* * * * *